United States Patent [19] [11] 3,875,120
Brinkmann et al. [45] Apr. 1, 1975

[54] TRANSPARENT POLYAMIDES FROM 1,3-BIS-(AMINOMETHYL)CYCLOHEXANE

[75] Inventors: Ludwig Brinkmann, Frankfurt am Main; Walter Herwig, Neuenhain, Taunus, both of Germany

[73] Assignee: Farbwerke Hoechst Aktiengesellschaft vormals Meister Lucius & Bruning, Frankfurt, Germany

[22] Filed: May 24, 1973

[21] Appl. No.: 363,415

[30] Foreign Application Priority Data
May 27, 1972  Germany............................ 2225938

[52] U.S. Cl.......... 260/78 R, 260/33.4 R, 260/78 S
[51] Int. Cl............................................. C08g 20/20
[58] Field of Search ............... 260/78 R, 78 A, 78 L

[56] References Cited
UNITED STATES PATENTS
2,916,476 12/1959 Caldwell et al. ................. 260/78 R
2,985,626 5/1961 Caldwell et al. ................. 260/78 R
2,985,627 5/1961 Caldwell et al. ................. 260/78 R
3,012,994 12/1961 Bell et al. ......................... 260/78 R Primary Examiner—Harold D. Anderson
Attorney, Agent, or Firm—Curtis, Morris & Safford

[57] ABSTRACT

There are disclosed and claimed novel polyamides characterized by a high transparency together with good mechanical and electrical properties, and especially suitable for the preparation of articles by injection moulding. The polyamides of the invention are prepared by known polycondensation methods from mixtures of 1,3-bis-(aminomethyl)-cyclohexane, optionally partially replaced by 1,4-bis-(aminomethyl)-cyclohexane, and at least one straight-chain aliphatic diamine, and mixtures of at least one aromatic dicarboxylic acid and at least one aliphatic saturated dicarboxylic acid.

15 Claims, No Drawings

TRANSPARENT POLYAMIDES FROM 1,3-BIS-(AMINOMETHYL)CYCLOHEXANE

Polyamides prepared from aliphatic diamines and aliphatic dicarboxylic acids have been known for decades. According to their composition, these polyamides are either crystalline substances having a high melting point, or amorphous substances having a relatively low second order transition temperature. The crystalline aliphatic polyamides are used for the preparation of fibres and injection moulded articles. The amorphous aliphatic polyamides are used in injection moulding. The second order transition temperatures of these amorphous polyamides are too low for use in many fields of application. In the German Auslegeschrift No. 1,234,354 and in the German Offenlegungsschrift No. 1,495,556 a number of polyamides were described which contain 1,3-bis-(aminomethyl)-cyclohexane and 1,4-bis-(aminomethyl)-cyclohexane as diamine components. The polyamides described are generally high-melting and opaque and are especially suitable for the preparation of fibres and sheets, but are little suited to the preparation of amorphous, transparent shaped articles.

The present invention provides a process for the preparation of transparent polyamides by polycondensation of diamines and dicarboxylic acids or their acid halides, esters, nitriles or amides in known manner and under the usual conditions wherein a. a mixture of
  α. 50 to 100 mol percent, preferably 65 to 100 mol percent 1,3-bis-(aminomethyl)-cyclohexane and 50 to 0 mol percent, preferably 35 to 0 mol percent, 1,4 bis-(aminomethyl)-cyclohexane, calculated on the sum of the bis-(aminomethyl)-cyclohexane components, and
  β. at least one straight chain aliphatic diamine containing 4 to 20 carbon atoms, preferably 6 to 12 carbon atoms, the proportion of aliphatic diamine(s) amounting to from 5 to 90 mol percent, preferably from 15 to 50 mol percent, calculated on the sum of the diamine components (α) and (β), and
b. a mixture of
  $\alpha_1$. at least one aromatic dicarboxylic acid containing from 7 to 20 carbon atoms, preferably from 8 to 14 carbon atoms, especially a mononuclear dicarboxylic acid carrying the carboxylic groups in the meta- or para-position, and
  $\beta_1$. at least one aliphatic saturated dicarboxylic acid containing from 5 to 20 carbon atoms, preferably from 6 to 12 carbon atoms, the proportion of the aliphatic dicarboxylic acid or acids amounting to from 10 to 90 mol percent, preferably from 30 to 70 mol percent calculated on the sum of the aromatic and aliphatic dicarboxylic acids ($\alpha_1$) and ($\beta_1$), or a mixture of the corresponding dicarboxylic acid derivatives are used.

The straight chain aliphatic diamine(s) and the aliphatic dicarboxylic acid(s) are used preferably in a molar ratio of 1:1.

The diamines 1,3-bis-(aminomethyl)-cyclohexane and 1,4-bis-(aminomethyl)-cyclohexane necessary for use according to the process of the invention can be obtained by hydrogenation of the corresponding xylylene diamines. For the preparation of the transparent polyamides trans-1,3-bis-(aminomethyl)-cyclohexane and mixtures of trans-1,3-bis-(aminomethyl)-cyclohexane and trans-1,4-bis-(aminomethyl)-cyclohexane are especially suitable. However, also the corresponding cis-diamines or mixtures of cis- and trans-diamines can be used.

Suitable straight chain aliphatic diamines which can be used according to the invention are for example: tetramethylene diamine, pentamethylene diamine or octamethylene diamine, preferably dodecamethylene diamine (1,12-diaminododecane). Hexamethylene diamine is especially preferred. Also mixtures of two or more straight chain diamines can be used.

Suitable aromatic dicarboxylic acids which can be used according to the invention are those having from 7 to 20 carbon atoms, preferably from 8 to 14 carbon atoms, or mixtures of these dicarboxylic acids. Especially suitable are mononuclear dicarboxylic acids carrying the carboxylic groups in the meta- or para-position, above all isophthalic acid and terephthalic acid.

Further examples of aromatic dicarboxylic acids suitable for use in accordance with the invention are 2,5-pyridine-dicarboxylic acid, 4,4'-diphenyl-dicarboxylic acid, 1,4-naphthalene-dicarboxylic acid, 1,5-naphthalene-dicarboxylic acid, 2,6-naphthalene-dicarboxylic acid, 4,4'-diphenylsulphone-dicarboxylic acid.

Mixtures of two or more of the aromatic dicarboxylic acids can also be used, especially mixtures of isophthalic acid with terephthalic acid or 4,4'-diphenylsulphone-dicarboxylic acid.

Suitable aliphatic dicarboxylic acids which can be used according to the invention are those having from 5 to 20 carbon atoms, preferably from 6 to 12 carbon atoms, especially adipic acid. Further advantageous examples of aliphatic dicarboxylic acids suitable for use in accordance with the present invention are 2-methylglutaric acid, pimelic acid, suberic acid, azelaic acid, sebacic acid or 1,10-decane-dicarboxylic acid.

Mixtures of two or more of the above-mentioned aliphatic dicarboxylic acids may also be used.

The use of the salt of hexamethylene diamine and adipic acid in the molar ratio of 1:1 has proved especially advantageous for the preparation of the polyamides of the invention.

The polyamides of the invention may be prepared in accordance with the known processes that have been developed for the preparation of polyhexamethylene adipamide. The diamines and dicarboxylic acids are put in an autoclave made of stainless steel, optionally with the addition of water and/or acetic acid.

It is sometimes expedient to prepare the salts of the diamines and dicarboxylic acids beforehand.

The components are heated, optionally in a nitrogen current, while stirring, to a temperature within the range of from about 200° to 250°C. Then, the steam is let off, and the temperature is increased to about 260° to 300°C. At this temperature the mixture is stirred for about 30 minutes in a nitrogen current. Finally, optionally in the vacuum, condensation is continued until the polyamide has attained the desired molecular weight.

It was surprising that the polyamides of the invention can be melted to a clear melt and can be worked into transparent shaped articles. It is a special advantage that for the preparation of the polyamides cheap monomers can be used, which are technically prepared in large quantities, as, for example, hexamethylene diamine and adipic acid.

It is often advantageous to use a surplus of up to 5 percent by weight, preferably from 0.5 to 2 percent by weight, of bis-(aminomethyl)-cyclohexane(s) and of aliphatic diamine(s) as compared to the dicarboxylic acids in order to compensate for distillation losses of diamines during polycondensation.

In the preparation of the polyamides instead of the dicarboxylic acids also their derivatives such as dicarboxylic acid halides, esters, nitriles or amides can be used.

Polyamides with especially high molecular weights and good mechanical properties are obtained when the polyamides prepared in the autoclave furnished with a stirrer are further condensed, preferably in a double-screw extruder under reduced pressure.

The polyamides of the invention which correspond to the general formula

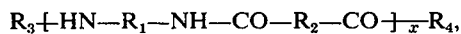

wherein $R_1$ represents a cyclohexane-1,3-bis-methylenyl radical, randomly distributed over the macromolecule, with from 0 to 50 mol percent, preferably from 0 to 35 mol percent of this radical being replaced by a cyclohexane-1,4-bis-methylenyl radical, and at least one, straight chain, bivalent aliphatic hydrocarbon radical, likewise randomly distributed over the macromolecule, and containing from 4 to 20 carbon atoms, preferably from 6 to 12 carbon atoms, the proportion of the aliphatic hydrocarbon radical or aliphatic hydrocarbon radicals being within the range of from 5 to 90 mol percent, preferably from 15 to 50 mol percent, calculated on the sum of the cyclohexane-bis-methylenyl and aliphatic hydrocarbon radicals, $R_2$ represents at least one bivalent aromatic hydrocarbon radical randomly distributed over the macromolecule, and containing from 5 to 18 carbon atoms, preferably from 6 to 12 carbon atoms, in particular, a mono-nuclear hydrocarbon radical bound in meta- or para-position, and at least one bivalent aliphatic saturated hydrocarbon radical likewise randomly distributed over the macromolecule and containing from 3 to 18 carbon atoms, preferably from 4 to 10 carbon atoms, the proportion of the aliphatic radical(s) being within the range of from 10 90 mol percent, preferably from 30 to 70 mol percent, calculated on the sum of the aromatic and aliphatic radicals, $R_3$ represents H or $OC-R_2-COOH$ and $R_4$ represents OH or $NH-R_1-NH_2$, and in which $x$ indicates the degree of polymerization, measured as reduced specific viscosity within the range of from 1.0 to 2.5 dl/g, preferably from 1.5 to 2.0 dl/g, determined in a 1 percent solution in phenol/tetrachloroethane (in a weight ratio of 60:40) at 25°C,
are distinguished by a high degree of transparency, a good impact strength and good dielectric properties and lend themselves readily to being processed by injection moulding.

In general, they have second order transition temperatures of above 100°C and they are suitable for the manufacture of injection-moulded articles that may also be used at higher temperatures. Some of the polyamides according to the invention, especially those that contain 1,4-bis-(aminomethyl)- cyclohexane in combination with terephthalic acid, may crystallize when heated for a sufficient length of time at temperatures above the second order transition temperature and are then opaque, but they can nevertheless be injection-moulded to form transparent articles, if injected into a sufficiently cooled mould.

Specially good polyamides are those of the formula indicated in which $R_1$ represents a cyclo-hexane-1,3-bis-methylenyl-radical, which is optionally replaced partly by a cyclo-hexane-1,4-bis-methlenyl-radical, and a $-(CH_2)_6-$ radical and $R_2$ represents a p-$C_6H_4$-(p-phenylene-) and/or m-$C_6H_4$-(m-phenylene) and a $-(CH_2)_4$ or a $-(CH_2)_{10}-$ radical, whereby these radicals are distributed randomly over the macromolecule, especially those polyamides in which the radicals $-(CH_2)_6-$ and $-(CH_2)_4-$, or $-(CH_2)_6-$ and $-(CH_2)_{10}-$ are contained in the molar ratio of 1:1.

Moulded articles prepared from the polyamides of the present invention are transparent and possess good dielectrical properties. Because of the high second order transition temperatures the moulded articles can be used at relatively high temperatures without losing their good mechanical properties. They have a high ball indentation hardness together with a good impact strength.

The polyamides of the present invention can be used in all cases where transparency and good mechanical properties at high temperatures are necessary. They can be processed into sheets, plates, tubes and, especially advantageously, by injection moulding, into technical parts.

The following examples illustrate the invention.

EXAMPLES

The viscosity measurements were carried out with solutions of 1 gram of polyamide in 100 ml of phenol-tetrachloroethane (in a weight ratio of 60:40) at 25°C. The second order transition temperatures were determined by differential thermoanalysis at a heating speed of 4°C/min.

EXAMPLE 1

A mixture of 3323 g of terephthalic acid, 1251 g of adipic acid, 2031 g of trans-1,3-bis-(aminomethyl)-cyclohexane, 871 g of trans-1,4-bis-(aminomethyl)-cyclohexane, 1015 g of hexamethylene diamine and 900 ml of water was introduced into an autoclave of stainless steel. After removing the atmospheric oxygen by nitrogen the mixture was pre-condensed for 2 hours at 210°C while stirring, in which process the pressure adjusted itself to 8.5 kg/cm².

Then, in the course of 1 hour the pressure was reduced to atmospheric pressure and at the same time the temperature was increased to 280°C. The mixture was stirred for 2 hours in the nitrogen current, at this temperature. A transparent polyamide with a reduced specific viscosity of 1.65 dl/g was obtained. The second order transition temperature of the product was 150°C.

Plates, measuring 60 × 60 × 2 mm were produced on an injection moulding machine from a part of this material. The cylinder temperature was 250°C and the temperature of the mould was 60°C.

The impact strength of the plates was tested by a fall test. Each plate was placed on a rigid support having a circular bore (diameter: 2.6 cm) in such a way that the centre of the plate is above the bore. A falling body (weight: 940 g) carrying a steel ball (diameter: 0.9 cm) at its lower end was dropped from various heights vertically and concentric to the bore onto the plate. As a measure of the impact strength there was determined the "mean falling height" in cm which denotes the height from which the falling body must fall onto the plates in order to cause 50 percent of them to break. The tests were carried out after the injection-moulded plates had been stored for 5 days in air at 20°C.

The mean falling height was 160 cm.

The ball indentation hardness of the plates, measured according to DIN 53 456 at a load of 50 kg, a ball diameter of 5 mm and a measuring time of 10 seconds, was 1840 kg/cm².

Little bars of another part of the material were produced on an injection moulding machine at the above specified temperature conditions. The E-modulus, obtained from the bending test corresponding to DIN 53 452, measured with a standard test bar was 29,000 kg/cm².

EXAMPLE 2

A polyamide was prepared from a mixture of 3323 g of terephthalic acid, 731 g of adipic acid, 2031 g of trans-1,3-bis-(aminomethyl)-cyclohexane, 871 g of trans-1.4-bis-(aminomethyl)-cyclohexane, 586 g of hexamethylene diamine and 850 ml of water according to the process described in Example 1.

The transparent polyamide obtained had a reduced specific viscosity of 1.55 dl/g. The second order transition temperature of the product was 168.5°C.

The material was processed as in Example 1 and tested. The mean falling height was 115 cm. The ball indentation hardness of the product was 1920 kg/cm². The E-modulus of the material was 35,600 kg/cm².

EXAMPLE 3

A polyamide was prepared from 166.1 g of terephthalic acid, 48.7 g of adipic acid, 101.6 g of trans-1,3-bis-(aminomethyl)-cyclohexane, 43.5 g of trans-1,4-bis-(aminomethyl)-cyclohexane and 39.5 g of hexamethylene diamine in a small autoclave according to the process described in Example 1. The transparent polyamide obtained had a reduced specific viscosity of 1.70 dl/g. The second order transition temperature of the product was 159°C.

EXAMPLE 4

A polyamide was prepared, according to the process described in Example 1, in a small autoclave, from 166.1 g of terephthalic acid, 57.5 g of 1,10-decane-dicarboxylic acid, 101.6 g of trans-1,3-bis-(aminomethyl)-cyclohexane, 43.5 g of trans-1,4-bis-(aminomethyl)-cyclohexane and 29.8 g of hexamethylene diamine. The transparent polyamide obtained had a reduced specific viscosity of 1.54 dl/g. The second order transition temperature of the product was 145°C.

The ball indentation hardness and E-modulus were determined as in Example 1. The ball indentation hardness of the polyamide was 1730 kg/cm². The E-modulus was 30,900 kg/cm².

EXAMPLE 5

A polyamide was prepared according to the process described in Example 1 in a small autoclave from 166.1 g of terephthalic acid, 98.6 g of 1,10-decane-dicarboxylic acid, 101.6 g of trans-1,3-bis-(aminomethyl)-cyclohexane, 43.5 g trans-1,4-bis-(aminomethyl)-cyclohexane and 50.7 g of hexamethylene diamine. The transparent polyamide obtained had a reduced specific viscosity of 1.68 dl/g. The second order transition temperature of the product was 133°C.

EXAMPLE 6

A polyamide was prepared from 166.1 g of terephthalic acid, 62.3 g of adipic acid, 145.1 g of trans-1,3-bis-(aminomethyl)-cyclohexane and 50.7 g of hexamethylene diamine in a small autoclave according to the process described in Example 1. The transparent polyamide obtained had a reduced specific viscosity of 1.59 dl/g. The second order transition temperature of the product was 146°C.

EXAMPLE 7

A polyamide was prepared from 166.1 g of terephthalic acid, 97.5 g of adipic acid, 145.1 g of trans-1,3-bis-(aminomethyl)-cyclohexane, and 78.1 g of hexamethylene diamine according to the process described in Example 1. The transparent polyamide obtained had a reduced specific viscosity of 1.60 dl/g. The second order transition temperature of the product was 126°C.

EXAMPLE 8

A polyamide was prepared according to the process described in Example 1 from 116.3 g of terephthalic acid, 49.8 g of isophthalic acid, 76.7 g of 1.10-decane-dicarboxylic acid, 145.1 g of trans-1,3-bis-(aminomethyl)-cyclohexane and 39.5 g of hexamethylene diamine. The transparent polyamide obtained had a reduced specific viscosity of 1.56 dl/g. The second order transition temperature of the product was 138°C.

EXAMPLE 9

A polyamide was prepared according to the process described in Example 1 from 183 g of isophthalic acid, 183 g of 4,4'-diphenylsulfone-dicarboxylic acid, 145 g of trans-1,3-bis(aminomethyl)-cyclohexane and 142 g of 1,12-diaminododecane. The transparent product obtained had a reduced specific viscosity of 1.52 dl/g. The second order transition temperature of the product was 148°C.

EXAMPLE 10

A polyamide was prepared according to the process described in Example 1 from 199 g of isophthalic acid, 93 g of 4,4'-diphenylsulfone-dicarboxylic acid, 46 g of 1,10-decane-dicarboxylic acid, 145 g of trans-1,3-bis-(aminomethyl)-cyclohexane and 142 g of 1,12-diaminodocecane. The transparent product had a reduced specific viscosity of 1.59 dl/g. The second order transition temperature of the product was 129°C.

What is claimed is:

1. A polyamide of the formula

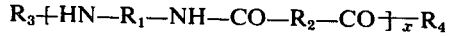

$$R_3+HN-R_1-NH-CO-R_2-CO+_xR_4$$

wherein:

R₁ represents a cyclohexane-1,3-bis-methylenyl radical, with from 0 to 50 mol percent of this radical being replaced by a cyclo-hexane-1,4-bis-methylenyl radical, and at least one, straight chain, bivalent aliphatic hydrocarbon radical containing from 4 to 20 carbon atoms, the proportion of the aliphatic hydrocarbon radical or radicals being from 5 to 90 mol percent, based on the sum of the cyclo-hexane-bis-methylenyl- and aliphatic hydrocarbon radicals, R₂ represents at least one bivalent aromatic hydrocarbon radical containing from 5 to 18 carbon atoms, and at least one bivalent aliphatic saturated hydrocarbon radical containing from 3 to 18 carbon atoms, the proportion of the aliphatic radical or radicals being from 10 to 90 mol percent, based on the sum of the aromatic and aliphatic radicals,
$R_3$ represents H or OC—$R_2$—COOH and
$R_4$ represents OH or NH—$R_1$—$NH_2$, and in which
$x$ indicates the degree of polymerization, measured as the reduced specific viscosity within the range of from 1.0 to 2.5 dl/g, determined in a 1 percent solution in phenol/tetrachloroethane in a weight ratio of 60:40 at 25°C.

2. The polyamide as claim in claim 1 wherein the bivalent aliphatic hydrocarbon radicals $R_1$ and the bivalent aliphatic hydrocarbon radicals $R_2$ are in a molar ratio of substantially 1:1.

3. The polyamide as claimed in claim 1, wherein the proportion of aliphatic hydrocarbon radical $R_1$ is from 15 to 50 mol percent, based on the sum of the cyclo-hexane-bis-methylenyl and aliphatic hydrocarbon radicals represented by $R_1$.

4. The polyamide as claimed in claim 1, wherein the proportion of aliphatic radical $R_2$ is within the range of from 30 to 70 mol percent, based on the sum of the aromatic and aliphatic radicals represented by $R_2$.

5. The polyamide as claimed in claim 1, wherein 0 to 35 mol percent of cyclohexane-1,3-bis-methylenyl radical represented by $R_1$ is replaced by cyclohexane-1,4-bis-methylenyl radical.

6. The polyamide as claimed in claim 1, wherein the bivalent aliphatic hydrocarbon radical or radicals $R_1$ contain 6 to 12 carbon atoms.

7. The polyamide as claimed in claim 1, wherein the bivalent aromatic hydrocarbon radical or radicals $R_2$ contain 6 to 12 carbon atoms.

8. The polyamide as claimed in claim 1, wherein the bivalent aromatic hydrocarbon radical $R_2$ is a mononuclear hydrocarbon radical bound in meta- or para-position.

9. The polyamide as claimed in claim 1, wherein the bivalent aliphatic saturated hydrocarbon radical or radicals $R_2$ contain 4 to 10 carbon atoms.

10. The polyamide as claimed in claim 1 wherein the aliphatic hydrocarbon radical represented by $R_1$ is a $—(CH_2)_6—$ radical, the aromatic hydrocarbon radical represented by $R_2$ is p-phenylene, m-phenylene, or mixtures thereof and the aliphatic hydrocarbon radical represented by $R_2$ is a $—(CH_2)_4—$ radical.

11. The polyamide as claimed in claim 1 wherein the aliphatic hydrocarbon radical represented by $R_1$ is a $—(CH_2)_6—$ radical, the aromatic hydrocarbon radical represented by $R_2$ is p-phenylene, m-phenylene or mixtures thereof and the aliphatic hydrocarbon radical represented by $R_2$ is a $—(CH_2)_{10}—$ radical.

12. The polyamide as claimed in claim 1 wherein the aliphatic hydrocarbon radical represented by $R_1$ is a $—CH_2)_6—$ radical, the aromatic hydrocarbon radical represented by $R_2$ is p-phenylene, m-phenylene or mixtures thereof and the aliphatic hydrocarbon radical represented by $R_2$ is a $—(CH_2)_4—$ radical, the $—(CH_2)_6—$ and $—(CH_2)_4—$ radicals being in a molar ratio of substantially 1:1.

13. The polyamide as claimed in claim 1 wherein the aliphatic hydrocarbon radical represented by $R_1$ is a $—CH_2)_6—$ radical, the aromatic hydrocarbon radical represented by $R_2$ is p-phenylene, m-phenylene or mixtures thereof and the aliphatic hydrocarbon radical represented by $R_2$ is a $—(CH_2)_{10}—$ radical, the $—(CH_2)_6—$ and $—(CH_2)_{10}—$ radicals being in a molar ratio of substantially 1:1.

14. The polyamide as claimed in claim 1 having a reduced specific viscosity of 1.5 to 2.0 dl/g.

15. A shaped article selected from sheets, plates, and tubes molded from a polyamide as claimed in claim 1.

* * * * *